3,039,257
COTTON SALVAGING APPARATUS
Lewis A. Brewster, Box 28286, Ave. 14½, Madera, Calif.; Eddie L. Brewster, executrix of said Lewis A. Brewster, deceased, assignor of forty-nine percent to Maurice C. Cash, Laveen, Ariz., Alice E. Cash, administratrix of said Maurice C. Cash, deceased
Filed Mar. 21, 1956, Ser. No. 572,875
4 Claims. (Cl. 56—28)

This invention relates to a method and apparatus for salvaging cotton or the like which has been dropped on the ground by a harvesting machine or by hand pickers or which has fallen from the cotton plants under force of the elements.

It is an object of this invention to provide a method of salvaging cotton lying on the ground, subsequent to harvesting, by passing cotton picking fingers over the ground in the furrows between the cotton rows for engaging and conveying the cotton to a receptacle.

Another object is to provide a cotton salvaging machine movable lengthwise over rows from which cotton has been harvested, and provided with means movable transversely across a furrow to pick up cotton lying on the ground and elevate it to a receiving station.

A further object is to provide a device of the character described which includes mechanism for removing extraneous objects from the movable portion of the machine before the cotton reaches the receiving station.

Other objects of the invention will be manifest from the following description of the present preferred form of the invention, taken in connection with the accompanying drawings, wherein.

Figure 1:
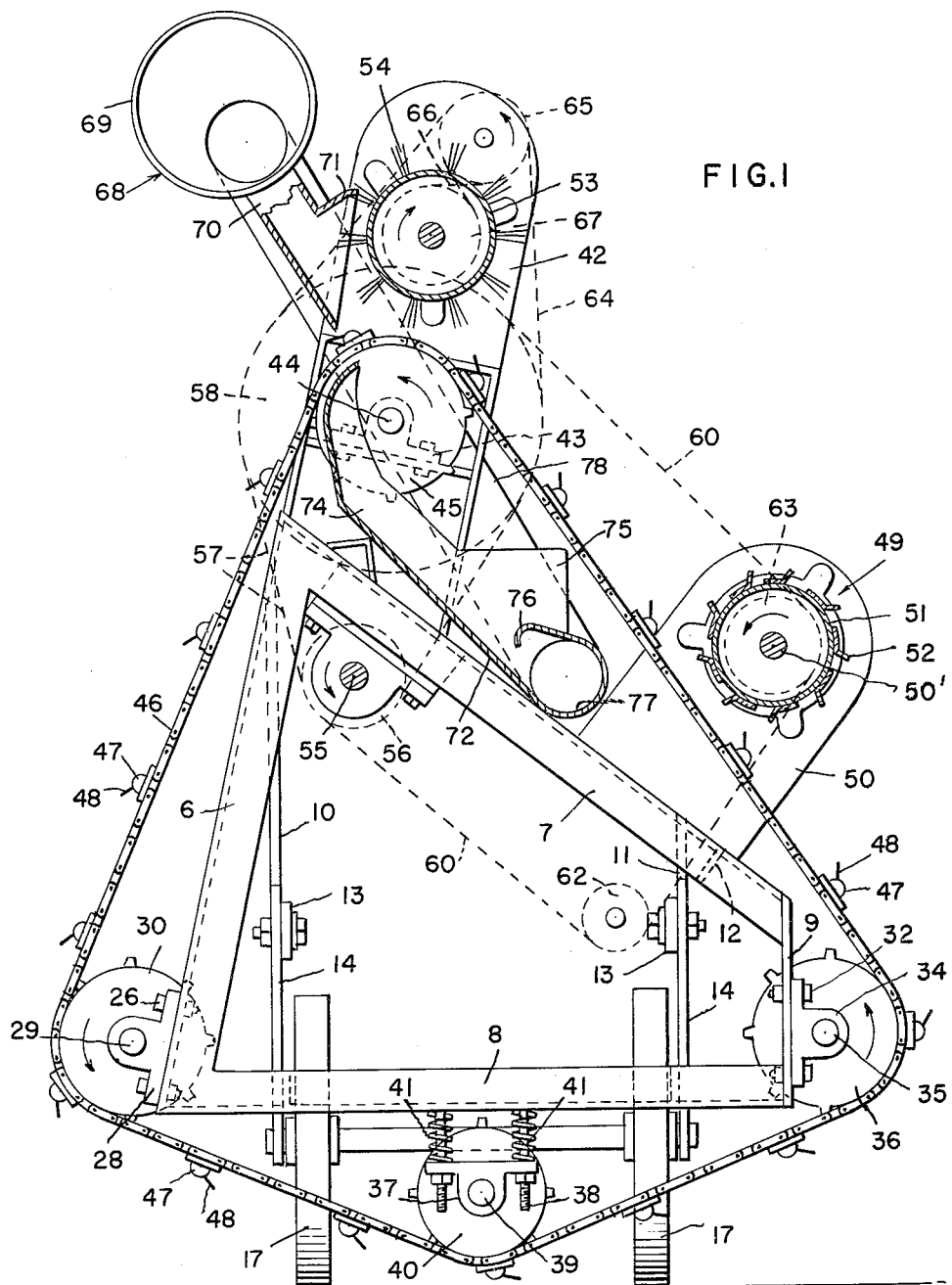
FIG. 1 is a front elevational view of a cotton salvage machine constructed in accordance with the present invention, portions thereof being removed and portions thereof shown in section, to disclose details of structure.
Figure 2:
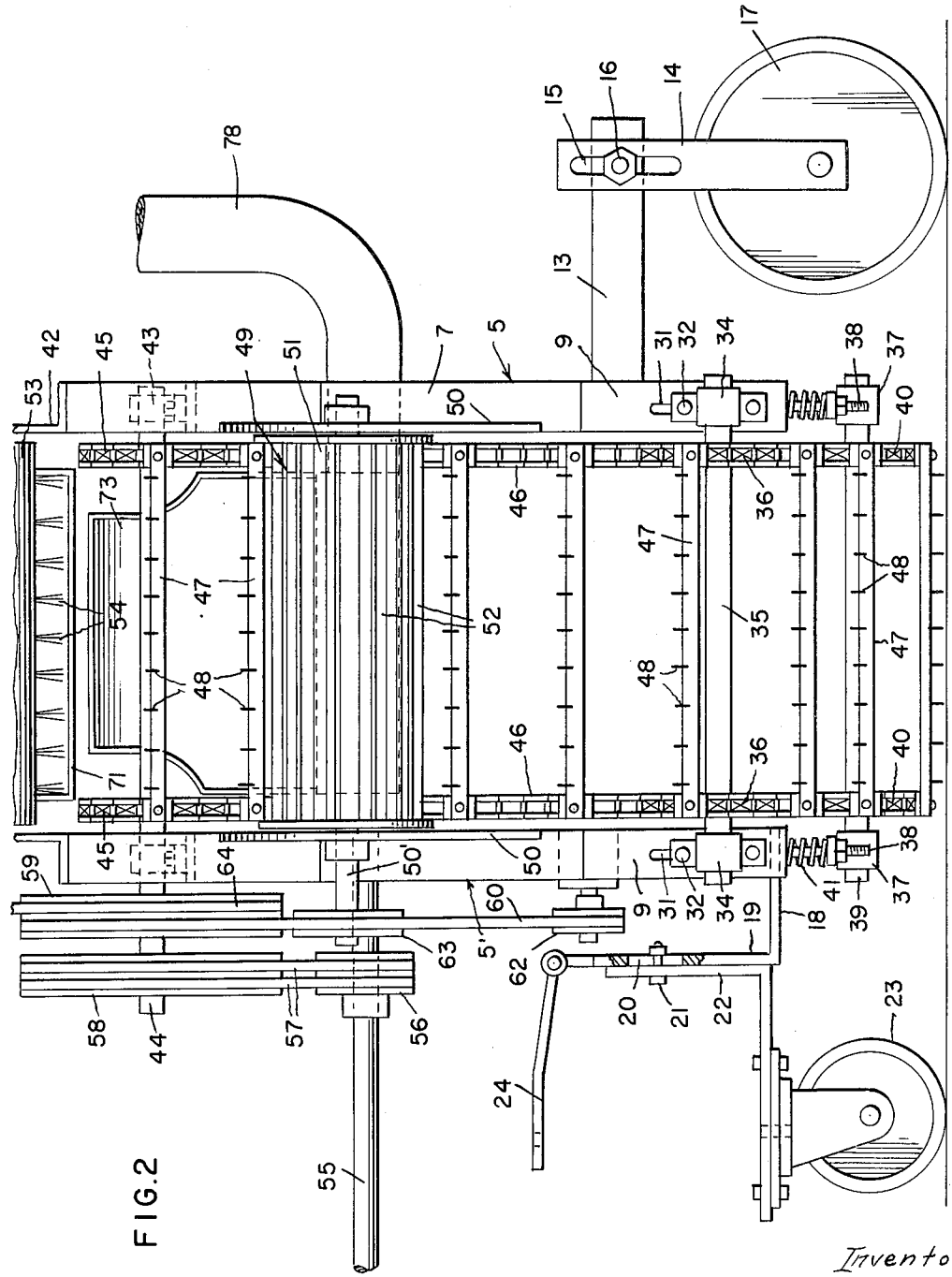
FIG. 2 is a side elevational view of the same.

The device of the present invention is designed and built to pick up cotton dropped by a conventional picking machine or by hand pickers or which has fallen to the ground under force of the elements. In general, this device comprises a set of two endless chains, each about 76" long, mounted in parallel relation about 36" apart. These chains move in a substantially triangular path. Mounted between the chains are spaced, parallel bars adapted to move transversely of each field furrow. Embedded in each bar and spaced about 3" apart, are picker fingers canted in the direction of travel of the bars, the fingers being adapted to engage the cotton lying on the ground between the rows of cotton plants and elevate it to a brush which removes the cotton from the fingers after which the cotton is conveyed to a suitable receptacle which constitutes a receiving station. A cylinder is fixedly mounted adjacent the picker fingers at a point between the lower run of the fingers and the brush, for removing sticks, burrs or other extraneous objects, that may adhere to the fingers when they pass over the ground. This insures a reasonably clean harvest which improves the grade of the cotton and effects economy in processing the cotton for the mills. In order to allow the picker fingers to follow the contour of the furrow between the rows, idler sprockets are spring-mounted near the lower terminal thereof for automatically regulating the path of the lower run of the picker fingers.

Referring now in greater detail to the drawings, the cotton salvage device of the present invention comprises a pair of spaced, substantially triangular frames of like construction, designated 5 and 5'. Since frames 5 and 5' are constructed alike, the same reference characters are used for like parts.

Frames 5 and 5' each include a side member 6 disposed at an angle to the vertical, to the upper terminal of which is welded or secured in any other suitable manner, a member 7. To the lower terminal of side member 6 is welded a third member 8 which is disposed in a horizontal plane. Members 6, 7 and 8 are preferably of angle-iron construction. The free terminals of members 7 and 8 are connected by a vertical piece 9, affixed thereto in any suitable manner.

Frame 5 is additionally provided with vertical braces or supports 10 and 11 extending from member 8 to members 6 and 7 respectively and connected thereto in a conventional manner. Angle-iron braces are indicated at 12. Extending from braces 10 and 11 at a point intermediate their length, are horizontal arms 13 from the outer terminals of which depend wheel supports 14. Supports 14 have vertical adjustment slots 15 in the upper portions thereof which are engaged by securing means 16 carried by arms 13 in a well known manner. Wheels 17 are rotatably mouted by suitable means, on the lower ends of the supports.

To the lowermost part of frame 5' is secured a U-shaped mounting bracket 18, the central part of which is enlarged to provide a plate 19 having an adjustment slot 20. Adjustably secured to plate 19 by engagement of suitable means 21, in slot 20, is a wheel mount 22 which carries a single wheel 23. A conventional tow bar 24 is mounted atop plate 19 for engagement with a traction vehicle to move the device lengthwise of the cotton rows.

The lower portion of member 6 of frames 5 and 5' is provided with a longitudinal slot 25 adapted to receive securing means 26 of which bearing housings 28 are adjustably affixed thereto. The terminals of a shaft 29 are rotatably mounted in bearing housings 28 to which shaft are secured, in spaced relation, sprocket wheels 30. Vertical pieces 9 of frames 5 and 5' are each likewise provided with a longitudinal slot 31 adapted to receive fastening means 32 for adjustably mounting bearing housing 34. A shaft 35 is mounted between bearing housings 34. Sprocket wheels 36 are fixedly secured to shaft 35 at points adjacent bearing housings 34.

Intermediate horizontal member 8 of frames 5 and 5', bearing members 37 are suspended by bolts 38. A shaft 39 is rotatably mounted between bearing members 37 to which are secured (adjacent bearing members 37) sprocket wheels 40. As shown to advantage in FIG. 1, coil springs 41 are convoluted about the shanks of bolts 38 for purposes to be hereinafter more fully set out.

Mounted near the upper terminals of frame member 7 are supporting units 42 to which are affixed bearing members 43 located superjacent frames 5 and 5'. A shaft 44, having the terminals thereof journaled in members 43 is provided on which shaft are mounted sprocket wheels 45.

Endless sprocket chains 46 of conventional construction are adapted to engage sprocket wheels 30, 36, 40 and 45 of frames 5 and 5'. As shown to advantage in FIG. 1, these belts move in a substantially triangular path at right angles to the direction of travel of the machine. Spanning the gap between endless sprocket chains 46, are a plurality of spaced, parallelly arranged bars 47. Multiple picker fingers 48 are fixed to bars 47 in spaced relation, the fingers being canted in the direction of travel of the fingers for impinging the cotton lying on the ground.

It is within the contemplation of the present invention to further provide a unit generally designated 49 for removing extraneous objects, such as twigs and burrs from the cotton that has been gathered by picker fingers 48. Unit 49 includes suitable bearing mountings 50 affixed to the lower portion of members 7 of frames 5 and 5', between which mountings is rotatably supported a shaft 50' carrying a cylinder 51 which is coextensive with bars 47.

The outer periphery of cylinder 51 is provided with multiple vanes 52 which are canted in a direction opposite to the rotation of the cylinder. As shown to advantage in FIG. 1, at the point of engagement with extraneous matter carried by picker fingers 48, vanes 52 are moving towards the approaching fingers.

Figure 3:
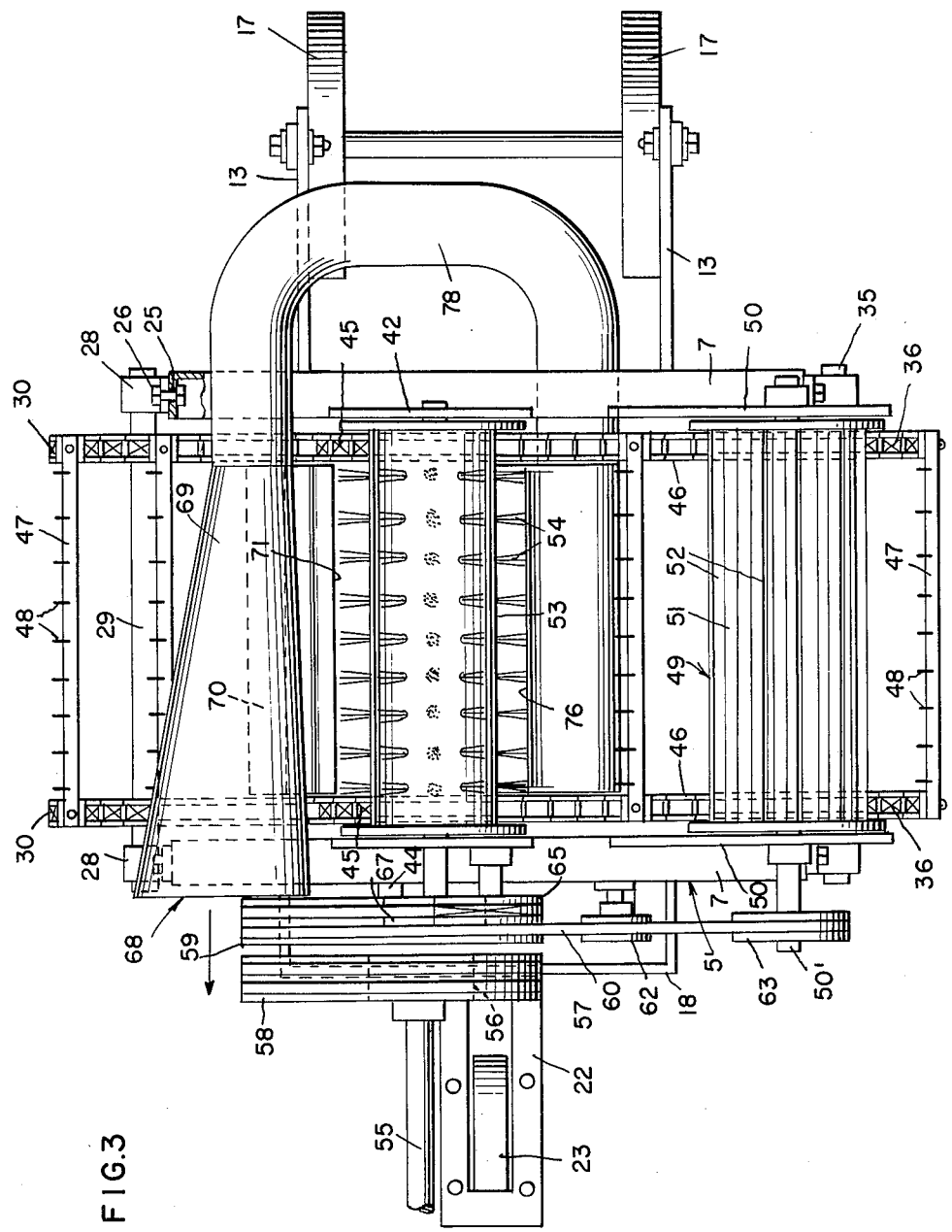
FIG. 3 is a top plan view of the present machine.

To aid the removal of cotton from fingers 48 as they reach the uppermost point in their travel, there is provided a brush cylinder 53, the terminals of which are conventionally journaled in supporting units 42. As shown to advantage in FIG. 3, cylinder 53 is coextensive with bars 47 and the outer periphery thereof is provided with a series of brushes 54 which, upon rotation of the cylinder in the direction of movement of picker fingers 48, act to disengage the cotton from the fingers.

Actuation of picker fingers 48, cylinder 51, and cotton removal cylinder 53 is effected by conventional means. This means includes a drive shaft 55 extending from a traction vehicle, secured to the end of which drive shaft is a drive pulley 56 from which pulley belts 57 extend to a pulley 58 fixed to shaft 44. Shaft 44 is provided with a second pulley 59 from which a belt 60 extends to drive pulley 56 and over idler pulley 62, mounted on frame 5, below pulley 59, in any suitable manner. From idler pulley 62, belt 60 extends to a pulley 63 affixed to cylinder shaft 50' for rotating cylinder 51. From that point, belt 60 returns to pulley 59. From pulley 59 there also extends a belt 64 which engages an idler 65 rotatably mounted between supporting units 42. A second belt 66 runs from idler 65 to a pulley 67 mounted on one end of cotton removal cylinder 53, this latter belt being crossed to effect rotation of brush cylinder 53 in the proper direction.

For removing the cotton to a suitable receptacle after it has been brushed from fingers 48, suitable means are employed which will insure delivery of all cotton removed from the fingers to the receptacle. One such means is shown in the drawings and includes a suction unit generally designated 68. This unit includes a cone-shaped duct 69, the enlarged opening of which is in communication with a receptacle through this duct work (not shown). A suction force may be exerted through this duct work and cone-shaped duct by any conventional means. Referring now to FIG. 1, it will be seen that duct 69 is provided with an extension 70 in the lower portion thereof, the outer terminal of which extension is flared as indicated at 71 to receive cotton as it is brushed from fingers 48. Under the suction force created in duct 69 and extension 70, the cotton is immediately drawn through extension 70, duct 69 and connected duct work, to a receptacle.

For the purpose of collecting any cotton which may fall from fingers 48 as it is being conveyed towards duct 69, or which may not be drawn into flared opening 71 upon removal by brushes 54, there is provided a catch plate 72. Catch plate 72 is mounted between frames 5 and 5' in a conventional manner, the upper portion being reduced as indicated at 73, so as not to interfere with pulleys 45. As shown in FIG. 1, the major portion of catch plate 72 extends substantially parallel to frame member 7 and is provided with side walls 74 which are enlarged near the bottom thereof, as indicated at 75. Near the lower part of pan 72 there is provided a lip portion 76 which is curled downwardly into the pan thereby providing a slot approximately one inch wide, through which the cotton passes into a trough 77. One end of trough 77 is closed. The other end of the trough is provided with an opening in which a duct 78 is inserted, said duct extending from the trough to the narrow end of cone-shaped duct 69.

In use of this method, it is important that after the regular harvesting operation has been completed, cotton picking fingers be moved across the furrows and the adjacent slopes of the rows in sufficiently close proximity to positively intercept bolls or other particles of the unharvested cotton lying on the ground and to convey this salvage cotton to a point above the furrow where the cotton may be conveniently removed from the fingers and directed into a suitable storage receptacle.

In operation, tow bar 24 is attached to any suitable traction vehicle in order to be moved lengthwise of the cotton field rows. It is next necessary to adjust the machine so that the lower run of sprocket chains 46 and consequently of bars 47 follows the contour of the field furrow along which the machine is traveling. This adjustment of the present machine comprises the step of first adjusting wheels 17 and wheel 23 to regulate the height of the machine to the desired point, which is effected by relocating securing means 21 and 16 in adjustment slots 15 and 20 respectively. Next, sprocket wheels 30 and 36 are raised or lowered by relocating bearing housings 28 and 34 respectively in slots 25 and 31. Finally, sprocket wheels 40 are raised or lowered by manipulation of means 38 in an obvious manner. When these adjustments are completed, power from drive shaft 55 of the traction vehicle, is used to actuate the cotton picking fingers transversely of the furrow, the adjustment of the machine being such that fingers 48 engage the ground on the lower run thereof to gather any cotton lying on the ground.

In order to assure that fingers 48 follow the contour of the ground without damage to the machine parts, due, for example, to a change in contour of the furrow, sprockets 40 are free to move upwardly under the force exerted by the ground against the tension of springs 41. When this force has been relieved, sprockets 40 return to their original position.

The cotton is then conveyed in the direction of the arrows shown in FIG. 1. Upon passing beneath unit 49, vanes 52, rotating as illustrated, engage any twigs or burrs that may have been picked up by fingers 48 and pull them away from the cotton. The cotton continues its upward path until it engages the brush unit 53 whereupon brushes 54 engage the cotton and push it off fingers 48. Brushes 54 not only remove the cotton from the fingers, but also tend to comb out the fibers, thereby producing a more desirable cotton product.

After the cotton has been removed from fingers 48, the major portion thereof is drawn into flared opening 71 by a suction force, from which point it is drawn upwardly into cone-shaped duct 69 and then through duct work into a suitable receptacle. That cotton which is not drawn into opening 71 drops into catch plate 72 where it gravitates into trough 77. The same suction force created at the mouth of opening 71, through duct 69, is also present in trough 77 by virtue of a duct 78 connecting the trough to duct 69.

While I have herein shown and described a preferred embodiment of my invention, it is nevertheless to be understood that various changes may be made therein, without departing from the spirit and scope of the appended claims.

What I claim is:

1. A cotton salvage machine comprising a mobile frame, a cotton pick-up and conveying means on said frame, said means comprising a first movable portion for engaging cotton, movable and extending transversely of and for at least the width of a lower part of said frame and adjustably mounted to follow the transverse contour of the furrow, a second movable portion of said means being located at an elevated part of said frame for discharging cotton, and cotton removing means on said frame in coacting relation with said second portion of said means, whereby cotton lying on the ground may be picked up therefrom and discharged at said elevated part.

2. In the cotton salvage machine of claim 1 means supported by said lower part of the frame, intermediate the sides of the latter, to yieldably hold said first movable portion in close proximity to the ground.

3. The cotton salvage machine of claim 1 with the addition of means mounted on said frame, intermediate said lower and elevated parts, engageable with said cotton pick-up and conveying means, for removing extraneous objects therefrom before the cotton reaches said elevated part.

4. The cotton salvage machine of claim 1 with the addition of suction means mounted on said frame and in communication with said cotton removing means.

References Cited in the file of this patent

UNITED STATES PATENTS

| | | |
|---|---|---|
| 24,609 | Bishop | July 5, 1859 |
| 794,265 | Watson | July 11, 1905 |
| 1,214,490 | Ford | Jan. 30, 1917 |
| 1,222,878 | Lint | Apr. 17, 1917 |
| 1,589,340 | Rodgers | June 15, 1926 |
| 1,713,397 | Rountree | May 14, 1929 |
| 2,136,126 | Dove | Nov. 8, 1938 |
| 2,172,507 | Grignolo | Sept. 12, 1939 |
| 2,664,691 | Wiebe | Jan. 5, 1954 |
| 2,715,809 | Buell | Aug. 23, 1955 |
| 2,730,855 | Thomas | Jan. 17, 1956 |